Aug. 2, 1949.                J. A. LOVE                2,477,994
                      IMPLEMENT HITCH FOR TRACTORS

Filed Oct. 15, 1943                              2 Sheets-Sheet 1

JABEZ A. LOVE.
    INVENTOR.

BY Oltsch & Knoblock
       Attorneys.

Aug. 2, 1949.  J. A. LOVE  2,477,994
IMPLEMENT HITCH FOR TRACTORS
Filed Oct. 15, 1943  2 Sheets-Sheet 2

JABEZ A. LOVE.
INVENTOR.
BY Oltsch & Knoblock
Attorneys

Patented Aug. 2, 1949

2,477,994

UNITED STATES PATENT OFFICE 2,477,994

IMPLEMENT HITCH FOR TRACTORS

Jabez A. Love, Eau Claire, Mich.

Application October 15, 1943, Serial No. 506,306

4 Claims. (Cl. 97—47)

This invention relates to an implement hitch for tractors, and more particularly to an implement hitch associated with power lift means capable of elevating and supporting an implement above and out of contact with the ground.

The provision of power lift mechanism in connection with an implement hitch on a tractor greatly simplifies and speeds farm and other earth-loosening and moving work by reducing the time and effort required to transport implements from place to place, by eliminating manipulations required when the end of a row being worked is reached, by permitting farm equipment to be moved along or across roads, etc. However, these advantages may be overbalanced if the device does not permit of adjustment of the implement to accomplish the efficient working effect of the implement which is desired. Thus it is often necessary to control the depth for which the implement is set, or the angle of attack of the implement, or the lateral position of the tool relative to the rear axle of the tractor. Also, it is desirable to exert pull upon the tractor in a manner to insure full tractive engagement of the rear driving wheels of the tractor with the ground.

The primary object of this invention is to provide a hitch for a tractor having a power lift, wherein the hitch is so constructed and adjustable as to provide all of the aforementioned desideratums.

A further object is to provide a hitch associated with a power lift and with which a wheeled implement is adapted for substantially rigid connection for elevating purposes only, whereby its working depth may be controlled by the wheel thereof at a point independent of the tractor.

A further object is to provide a hitch for a tractor having a power lift, wherein a pair of draw bars connected with said power lift are mounted independently for selective individual adjustment.

A further object is to provide a hitch for connecting a wheeled implement to a tractor having a power lift, wherein said implement is connected in substantially fixed relation to said hitch for bodily elevation thereof by operation of said power lift.

A further object is to provide a tractor hitch including a pair of rigid longitudinal members to which an implement may be substantially rigidly attached, with means for adjusting the angular position of each rigid member and the longitudinal and vertical position of each point of implement attachment.

Figure 1:
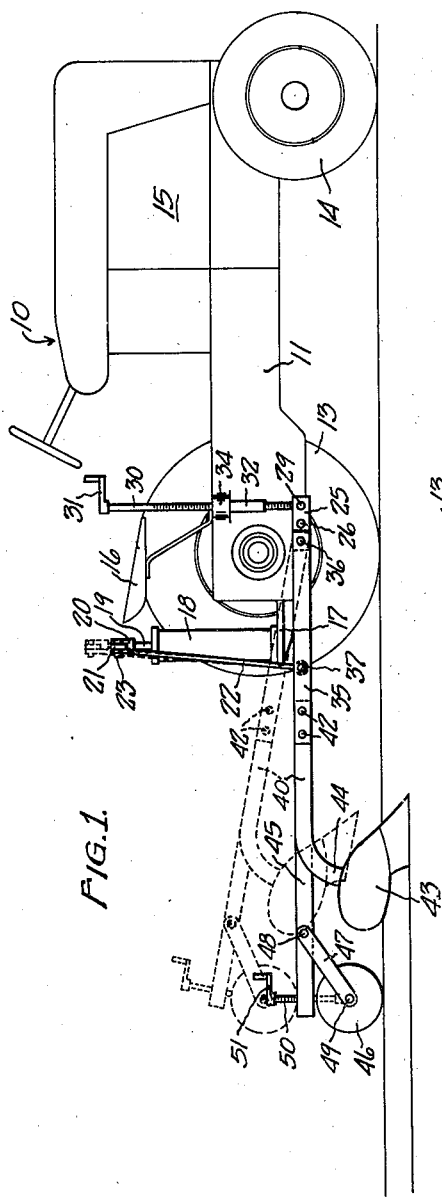
Fig. 1 is a side view of a tractor-implement assembly connected by my hitch, wherein one rear wheel of the tractor has been removed.
Figure 2:
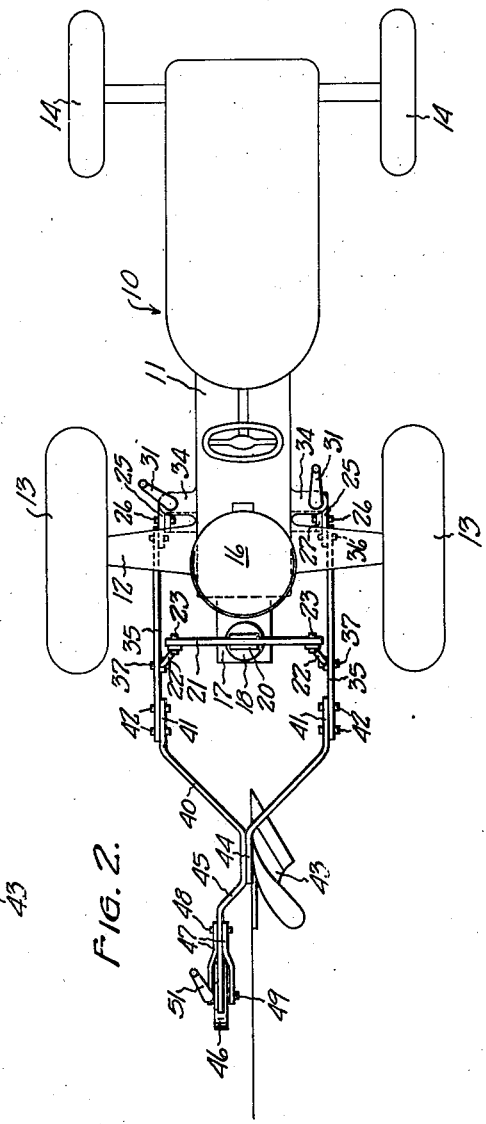
Fig. 2 is a top plan view of the tractor-implement assembly.

Referring to the drawings, which illustrate one embodiment of my invention, the numeral 10 designates a tractor having frame 11, rear axle 12, rear wheels 13, front wheels 14, engine 15 and operator's seat 16. The tractor may be of any type or construction. While a tractor is shown and will be used most generally, any other type of vehicle, such as an automotive truck, may have my hitch associated therewith. Thus, for example, my hitch may be mounted on a truck to tow a road striping or marking device.

A horizontal platform 17 is secured to or formed integrally with the tractor frame 11 to project rearwardly from the transverse central portion of the tractor frame. Upon this platform is mounted a vertical cylinder 18 having connections (not shown) for forcing liquid therein and draining liquid therefrom to act upon a piston therein (not shown) to which is connected a vertical shaft 19 projecting slidably through the top of the cylinder. Shaft 19 mounts a head or bracket 20 for supporting an elongated horizontal cross head 21 extending substantially parallel to the rear axle 12 of the tractor. A pair of rigid links 22 are swiveled and suspended at 23 from opposite end portions of the cross head in equispaced relation to shaft 19.

At each side of the tractor is positioned a tilt-bar 25 which is pivoted substantially centrally thereof at 26 to a member 27 about a horizontal axis parallel to tractor axle 12. Members 27 may be integral parts of frame 11 or may be rigid parts fixedly secured to the tractor frame. Tilt bars 25 extend longitudinally of the tractor, and the pivot axes thereof are preferably aligned and positioned in forwardly spaced relation to and below the level of tractor axle 12. At its forward end each tilt bar 25 mounts a block or fitting 28 pivoted thereto at 29 about an axis parallel to the axis of pivot 26. Block 28 includes a socket portion in which the lower end of an elongated upright shaft 30 has a rotatable fit. Shaft 30 is screw threaded and mounts a crank 31 at its upper end. An internally screw threaded non-rotatable sleeve 32 has a pivot or swivel connection at 33 with a part 34 rigid and fixed relative to the tractor frame and spaced above the level of tilt bar pivot 26. The threads of the shaft 30 and sleeve 32 interengage to adjustably position the shaft 30 and thereby control the position of the tilt bar connected to said shaft.

Figure 4:
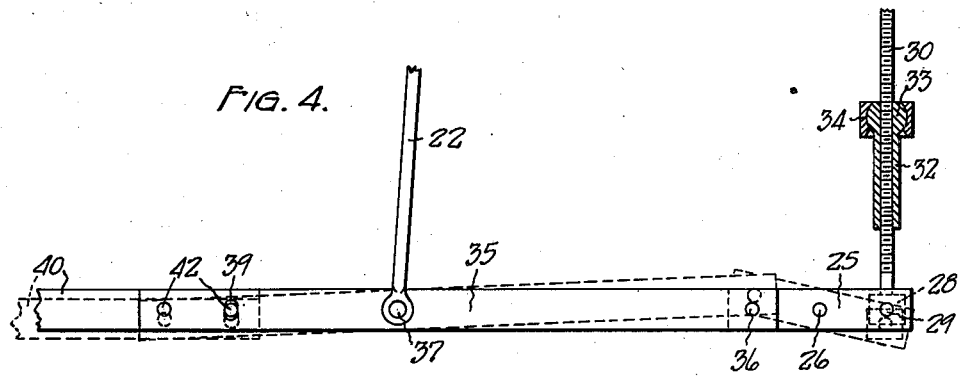
Fig. 4 is a fragmentary side view of one of the hitch members, with parts shown in section.

A rigid longitudinally extending elongated draw bar 35 is pivoted at 36 to the rear end of each tilt bar and extends rearwardly therefrom. Links 22 are pivotally connected with the draw bars 35 at 37 substantially at mid-length of said draw bars. A pair of longitudinally spaced connection points, here shown as apertures 38 and 39, is provided at the rear portion of each draw bar. Where apertures are provided, one thereof, as 39, may be slightly elongated vertically and curved as shown in Fig. 4 for purposes to be set forth hereinafter.

Any implement, such as a plow, harrow, cultivator, etc., which has a rigid frame, may be connected to the draw bars 35. A plow has been selected for illustration. The plow frame 40, illustrated, has a pair of spaced parallel horizontal forwardly projecting rigid arms 41, each of which is attached to a draw bar 35 at the two attachment points 38 and 39, as by means of studs or bolts 42. A plow 43 is rigidly mounted on the frame at 44, preferably intermediate the length thereof. Frame 40 projects rearwardly of plow 43 to provide a rigid rear frame portion 45 for mounting a ground-engaging wheel 46. Rigid links 47 are pivoted at 48 to the rear frame portion 45 and extend rearwardly and downwardly to support and position the axle 49 of wheel 46. A screw threaded hold-down shaft 50 fits rotatably in a suitable socket member carried by wheel axle 49, and has a screw threaded connection with a block or like member pivoted to the frame above the wheel. A crank 51 is mounted on the upper end of hold-down shaft 50.

In normal use of the device, the power lift means is de-energized to permit the draw bars 35 and the frame 40 of the implement to assume their normal substantially horizontal position extending rearwardly from pivots 36 connecting said draw bars with tilt bars 25. The depth at which the ground working tools, such as plow 43, operate is determined solely by the adjustment of the rear wheel 46 relative to the implement frame 40. The draw bars and tilt bars transmit the pull exerted by the ground working tool directly to the tractor frame, and none of the stress or pull thereof is applied to the power lift means. Thus a simple direct hitch, with depth adjustment at the implement, is provided.

When it is desired to elevate the implement, as when the end of a row being cultivated is reached or when the implement is being transported from place to place, the power lift means are operated to elevate the cross bar 21 and links 22. This results in pivoting of draw bars 35 about pivots 36 at their forward ends, said pivots preferably being spaced below the rear axle 12 of the tractor to permit substantial upward tilting of said draw bars. The frame 40 of the implement being attached to the draw bars at the four points 38 and 39, is held in substantial alignment with said draw bars as the latter are tilted, so that the implement is moved bodily upward to desired elevation above the ground, as illustrated in dotted lines in Fig. 1. It will be noted that the elevating of the draw bars and implement is independent of the tilt bars, which remain in the positions at which they have been set. The power means is so constructed that it may maintain any elevated position at which it is set, so that the tractor can travel from place to place quickly and can maneuver in a small space without interference from the implement and without danger of damage to the implement or to roads or other surfaces over which the tractor-implement unit passes. Also, the need for manually handling implements, as to load and unload the same for transport between storage places and work areas is completely eliminated.

Figure 3:
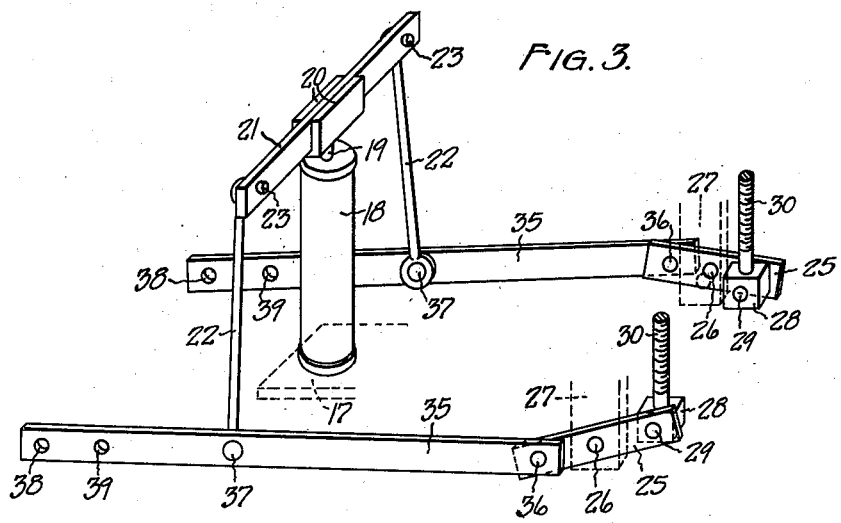
Fig. 3 is a perspective view of the hitch and power lift elements, illustrating one adjustment of the hitch.

A further important advantage of the device resides in the provision for adjustment of the position of the implement to control its angle of attack. This is accomplished by adjusting the tilt bars 25 by means of crank 31 and shaft 30. Thus, assume that it is desirable for the implement to be tilted laterally, with the left side thereof as viewed from the rear positioned at a lower level than the right side. The tilt bars may then be positioned as illustrated in Fig. 3 to elevate the pivot point 36 of the left draw bar and depress the pivot point 36 of the right draw bar. The pivot connections 37 between the bars 35 and links 22 then become fulcrums for the draw bars, so that the rear end of the left draw bar is depressed and the rear end of the right draw bar is elevated. Since the connections between the rear ends of the draw bars and the rigid frame of the implement are substantially rigid, the transverse position of the implement corresponds to relative elevations of the draw bars at attachment points 38 and 39.

While adjustment of both draw bars has been illustrated and described, it is possible for one to remain in its normal substantially horizontal position, while the other is longitudinally tilted, to achieve the lateral tilting of the implement. However, the last named single adjustment will alter the angle of attack of the tool with the ground relative to the longitudinal axis of the implement, as shown in dotted lines in Fig. 5, because the longitudinal tilting of one draw bar only moves the attachment end thereof slightly forwardly, relative to the opposite normally positioned draw bar.

Other conditions for which the hitch will compensate are differences in the height of the frames of different implements. Thus, if the frame of one implement has a working position or clearance above ground level in excess of the height of the pivot axes 26 of the tilt bars 25, this difference can be accommodated by equally depressing the rear ends of both tilt bars until the attachment points 38, 39 at the rear ends of both draw bars are at the proper elevation for the frame of the implement. The draw bars can be adjusted for implement frames having low clearance by a reverse adjustment, i. e. by elevating pivot axes 36 and thus depressing attachment points 38, 39.

Figure 5:
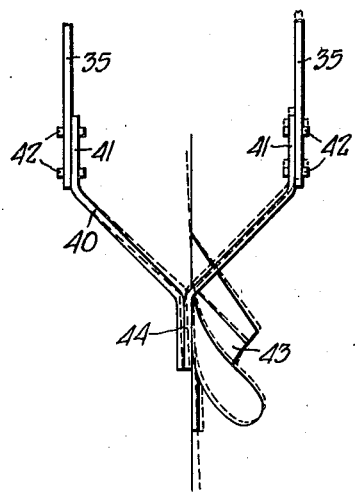
Fig. 5 is a fragmentary top plan view illustrating an angular hitch-controlled adjustment of an implement relative to the longitudinal axis of the tractor.

The simplicity of the adjustment of the implement relative to the longitudinal axis of the tractor is apparent from Fig. 5. Thus, where it is desired to control the width of a furrow when plowing, etc., it is only necessary to manipulate the device to position the attachment points 38 and 39 of one draw bar forwardly relative to the longitudinal positions of the corresponding attachment points of the other draw bar. Since the draw bars are suspended from the swiveled links 22, and have their draft connections at their pivots 36 with the tilt bars 25, their longitudinal positions are dependent upon the relative positions of the tilt bars. In other words, when one tilt bar is shifted about its axis 26, the movement of the draft point 36 thereof has longitudinal and vertical components. The function of the vertical component to control lateral tilting has been explained. The function of the longitudinal component is to vary the longitudinal positions of attachment points 38 and 39, and thereby vary the angle of implement attack relative to the longitudinal axis of the tractor. The only condition in which the longitudinal angle of attack will not be effected by different adjustments of the two tilt bars 25 occurs when said bars are tilted at the same angle relative to the horizontal, but in opposite directions; such adjustment controlling lateral tilting only.

Inasmuch as the various adjustments mentioned above entail the assumption of longitudinally inclined position by one or both of draw bars 35, whereas substantially horizontal positioning of the longitudinal members of the implement frame may be necessary or desirable, the arrangement of the attachment apertures shown in Fig. 4 may be desirable. Thus, if one of the attachment apertures, as 39, in each draw bar, is provided with play or clearance, as by slight vertical elongation, the implement can be permitted to assume its own longitudinal level. The length of the draw bars being much greater than their vertical displacement limits the angle of longitudinal tilting thereof, so that a comparatively small amount of play will be sufficient. Consequently, while the attachment of the implement is not rigid, it is substantially so, and will not interfere with elevation of the implement as shown in Fig. 1. In other words, after the vertical lost motion or play at the attachment points between the implement and draw bars has been taken up by the initial upward swinging of the draw bars by the power lift means, the connection becomes rigid for the desired bodily elevation of the implement.

Another advantage of the device is that an implement can be attached to or detached from the tractor by simply connecting it to the draw bars, as by means of the bolts or studs 42 passed through draw bar apertures 38, 39.

It will be understood that the construction described and shown is illustrative only, and is not intended to be limiting. Thus, power lift means of different construction, structurally different tilt-bar control means, structurally different connections of tilt-bars with the tractor and structurally different connections between the draw bars and the implement frame may be employed without departing from the spirit of the invention, as will be apparent.

I claim:

1. In combination, a tractor, power lift means carried by said tractor, a wheeled implement having a rigid frame, a pair of short tilt bars pivoted to said tractor about transverse axes forwardly of said power lift means, means for locking said tilt bars in selected position, a pair of elongated draw bars each pivoted at its front end to a tilt bar and suspended intermediate its ends from said power lift means, and means for detachably and rigidly connecting said frame to the rear ends of said draw bars.

2. The combination with a tractor having power lift means, of an implement hitch comprising a pair of rigid longitudinal draw bars suspended from said power lift means intermediate their ends, a pair of short levers pivoted to opposite sides of the tractor about transverse axes, a pair of adustable means each selectively locking a lever in desired position, the forward ends of said draw bars being pivotally connected to said last named means, and longitudinally spaced means at the rear of each draw bar for detachably and rigidly securing an implement thereto.

3. The combination with a tractor having power lift means, of a pair of short tilt bars pivoted to said tractor at opposite sides thereof about transverse axes, a screw threaded socket pivoted to said tractor above each bar, a shaft threaded in each socket and connected with the adjacent tilt bar to position said bar, and a pair of rigid longitudinal draw bars each pivoted o a tilt bar at its front end and suspended from said power lift means intermediate its ends.

4. In combination, a tractor, an implement having a rigid frame and a supporting wheel, means for adjusting said frame vertically relative to said wheel, a pair of short rigid members pivoted at opposite sides of said tractor about transverse axes, rigid elongated draw bars pivoted at their forward ends to said rigid members spaced from the pivot axes thereof, detachable means providing a multiple point rigid connection between the rear end of each draw bar and the frame, means carried by said tractor to fulcrum said bars intermediate their ends, and means for selectively controlling the angular position of each rigid member.

JABEZ A. LOVE.

REFERENCES CITED

The following references are of record in the file of this patent:

UNITED STATES PATENTS

| Number | Name | Date |
| --- | --- | --- |
| 1,295,525 | Kish | Feb. 25, 1919 |
| 1,893,619 | Geraldson | Jan. 10, 1933 |
| 1,902,845 | Graham et al. | Mar. 28, 1933 |
| 2,151,270 | Hamill | Mar. 21, 1939 |
| 2,167,210 | Imsick | July 25, 1939 |
| 2,198,196 | Goldup | Apr. 23, 1940 |
| 2,203,972 | Silver | June 11, 1940 |
| 2,222,115 | Mott | Nov. 19, 1940 |

FOREIGN PATENTS

| Number | Country | Date |
| --- | --- | --- |
| 539,003 | Great Britain | Aug. 25, 1941 |
| 634,155 | France | Nov. 8, 1927 |
| 677,027 | France | Dec. 7, 1929 |